US005407679A

United States Patent [19]

Hayes

[11] Patent Number: 5,407,679

[45] Date of Patent: Apr. 18, 1995

[54] SHARK REPELLANT PATCH

[76] Inventor: Justin Hayes, 89 Bridle Path Rd., North Andover, Mass. 01845

[21] Appl. No.: 177,432

[22] Filed: Jan. 5, 1994

[51] Int. Cl.[6] .................... A62B 37/00; A01N 25/00; A01N 25/34

[52] U.S. Cl. .................................... 424/402; 424/405; 424/409; 428/43; 428/57; 428/58; 2/2.15; 2/908; 2/910; 2/911

[58] Field of Search ............... 424/402, 405, 409, 411; 2/2, 2.1 R; 428/43, 47, 58

[56] References Cited

U.S. PATENT DOCUMENTS

| | | | |
|---|---|---|---|
| 2,468,394 | 4/1949 | Dinsley | 424/405 |
| 3,755,064 | 8/1973 | Maierson | 161/174 |
| 4,494,245 | 1/1985 | Burkhead et al. | 2/161.6 |
| 4,602,384 | 7/1986 | Schneider | 2/2 |
| 4,816,260 | 3/1989 | Wollrich | 424/463 |
| 4,917,280 | 4/1990 | Schneider | 224/223 |
| 4,933,187 | 6/1990 | Schneider | 424/497 |

*Primary Examiner*—John Kight, III
*Assistant Examiner*—Jeffrey Culpeper Mullis
*Attorney, Agent, or Firm*—Weingarten, Schurgin, Gagnebin & Hayes

[57] ABSTRACT

A shark repellant patch is provided which includes a highly flexible, impermeable membrane sealing a shark repelling substance to a highly flexible base. The membrane is provided with imperfections that cause the membrane to shear when it is subjected to a predetermined level of force. In one embodiment of the invention, a tab is provided proximate the imperfections to facilitate rupturing the membrane. An adhesive is applied to a portion of the base. An exemplary method of fabrication is also provided.

4 Claims, 4 Drawing Sheets

SHARK REPELLANT PATCH

FIELD OF THE INVENTION

The present invention relates to an improved delivery system for a shark repelling substance, and more particularly to an easily opened, impermeable, highly flexible enclosure for a shark repellant.

BACKGROUND OF THE INVENTION

Shark attack is a long recognized problem faced by divers and surfers as well as recreational ocean swimmers. A variety of devices are known that include electrical, mechanical, and chemical techniques for warding off a shark attack.

Chemical techniques are dependant on both the particular formulation of the shark repelling substance and the method or device for delivering the substance into the aquatic environment. A common shark repelling substance is anhydrous sodium sulfate mixed in equal parts by volume with sodium laurel sulfate. To be effective, the substance must not only be an effective repellant, it must also be released at an appropriate time prior to an attack and have sufficient persistence to outlast a shark's patience.

An example of a shark repellant delivery system is disclosed in U.S. Pat. No. 4,602,384 to Schneider, wherein a full body suit is covered with pockets containing a chemical repellant. However, the repellant is not dispersed into the water until a shark nibbles on the suit. This configuration of this system is predicated on the assumption that a shark will not start its meal with a big bite.

Another shark repellant delivery system is disclosed in U.S. Pat. No. 4,917,280 to Schneider, wherein a liquid permeable belt is provided with cells containing chemical repellant capsules, each capsule having a different time-delay coating. The configuration of the belt allows water to enter the cells the instant the belt is immersed in the water. Although such an arrangement provides a steady dispersal of chemical repellant into the water, a wearer is unable to delay the moment of dispersal, making it unsuitable for a diver or surfer who might not encounter a shark immediately upon entry to the water.

Yet another delivery system is disclosed in U.S. Pat. No. 4,816,260 to Wollrich, wherein a capsule containing repellant is mounted on a stiff, but flexible, support. Bending the support ruptures the capsule and disperses the repellant into the environment. Although such an arrangement allows for the repellant to be dispersed on demand, the necessary rigidity of the support does not lend itself to applications wherein it would be preferable to have a compliant support, such as a wrist or ankle band. Additionally, the technique required to burst the capsule is incompatible with applications wherein it would be preferable to affix the device to a wetsuit or other article of scuba gear to provide ready access to the device.

In view of these limitation of the prior art with respect to the needs of swimmers, surfers and divers, it would be desirable to provide a conveniently wearable, easily opened, delivery system for a chemical shark repellant.

SUMMARY OF THE INVENTION

The present invention provides a shark repellant patch that delivers a chemical shark repellant into an aqueous environment upon demand. The shark patch includes a highly flexible, impermeable membrane that seals a shark repelling substance to a highly flexible base.

In one embodiment of the shark patch, the membrane separates from the highly flexible base when subjected to a predetermined level of force. In a second embodiment, the membrane includes surface imperfections that weaken the tensile strength of the membrane in a localized region. In yet a third embodiment, a tab is provided proximate the region of weakened tensile strength to facilitate rupturing the membrane.

With respect to each of the embodiments of the shark patch, an adhesive can be applied to a portion of the base for securing the shark patch to a selected surface. Alternatively, the shark patch can be secured to a diver's body with a strap or belt.

A method of making a shark patch is provided which includes the steps of: placing dollops of a shark repellant at multiple locations on a highly flexible substrate; securing a highly flexible, impermeable membrane to the substrate to isolate the dollops from each other and the environment; and cutting the substrate to provide a shark patch including at least one dollop of isolated shark repellant. Additional steps include inducing imperfections in the surface of the membrane, and attaching a pull tab to the membrane proximate the imperfections.

BRIEF DESCRIPTION OF THE DRAWINGS

These and other advantages and features of the present invention will be more readily understood by reference to the following detailed description when considered in conjunction with the accompanying drawings wherein.

DETAILED DESCRIPTION OF A PREFERRED EMBODIMENT

Figure 1A:
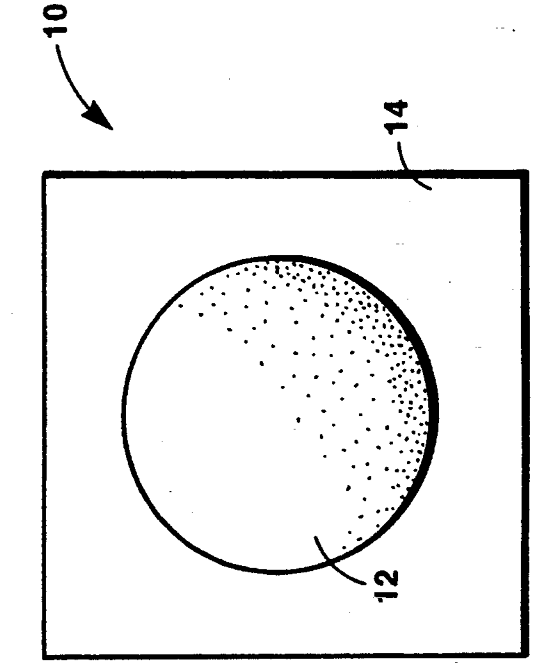
FIG. 1A is a top plan view of a shark patch.
Figure 1B:
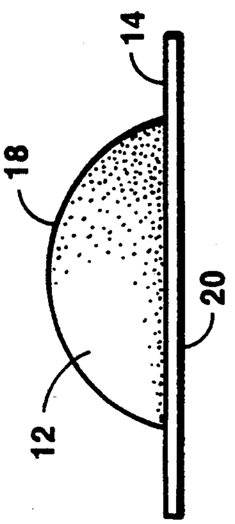
FIG. 1B is a side elevational view of the shark patch of FIG. 1A.

FIGS. 1A and 1B depict a shark patch 10 capable of delivering a shark repellant 12 on demand into an aqueous environment. Shark repellant delivered by the shark patch 10 can include anhydrous sodium sulfate mixed with sodium laurel sulfate, or other shark repellant known in the art.

The illustrated shark patch 10 includes a highly flexible base 14 and a highly flexible, impermeable sealing membrane 18 which together envelop and isolate the shark repellant 12 from the environment. The sealing membrane 18 and the base 14 are fabricated from readily available elastomers that are known in the art, and which are sufficiently compliant to permit the shark patch 10 to be easily bent, or to have a "floppy" characteristic. The floppiness of the shark patch 10 permits it to be readily conformed to a curved or undulating surface without releasing its contents. An adhesive can be disposed on a second side 20 of the highly flexible base 14 to facilitate attaching the shark patch 10 to a selected surface, such as a wetsuit, life jacket, bathing suit, and the like. In addition to being highly compliant, a preferred embodiment of the shark patch measures approximately 2.5 inches on each side of a square patch.

The sealing membrane 16 is bonded to the base 14 with mechanical aids, with adhesive, with a heat "weld," or other bonding technique known in the art so that the membrane 18 separates from the base 14 when the membrane 18 is subjected to a predetermined level of tension. For example, were a shark to be encountered, a diver would grasp the lump of shark repellant 12 and pull, thus separating the membrane 18 from the base 14 and dispersing the shark repellant 12 in the water.

Although FIGS. 1A and 1B illustrate a shark patch 10 having a single enclosure for shark repellant 12, other embodiments of the shark patch include more than one enclosure for release of shark repellant on demand, after an initial dispensation of shark repellant 12 has been accomplished.

Figure 2A:
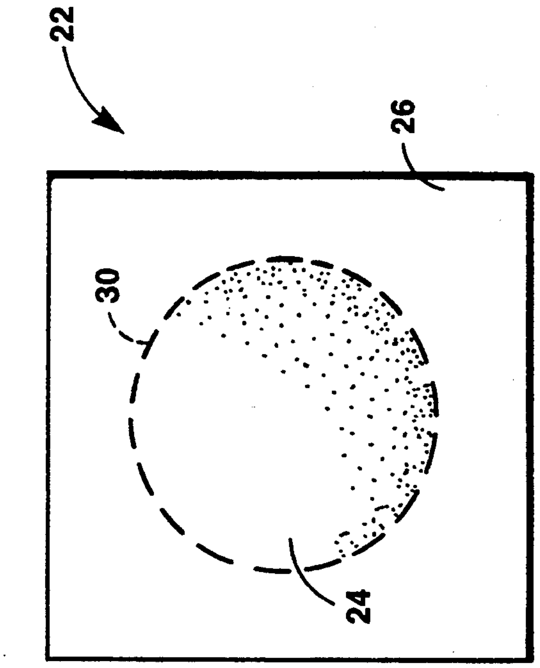
FIG. 2A is a top plan view of an alternative embodiment of the shark patch of FIG. 1A.
Figure 2B:
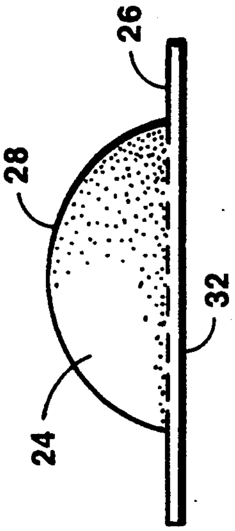
FIG. 2B is a side elevational view of the shark patch of FIG. 2A.

FIGS. 2A and 2B illustrate another embodiment of a shark patch 22 having a shark repellant 24 disposed on a highly flexible base 26 and surrounded by a highly flexible, impermeable sealing membrane 28. In this embodiment, the membrane 28 is provided with surface irregularities 30 that weaken the tensile strength of the membrane proximate the surface irregularities 30. Thus, when the membrane 28 or shark repellant 24 is pulled, the surface irregularities 30 cause the membrane 28 to rupture proximate the surface irregularities 30 in a predictable manner. An adhesive can be applied to a second side 32 of the highly flexible base 26 to facilitate mounting the patch 22 to a selected surface.

Figure 3A:
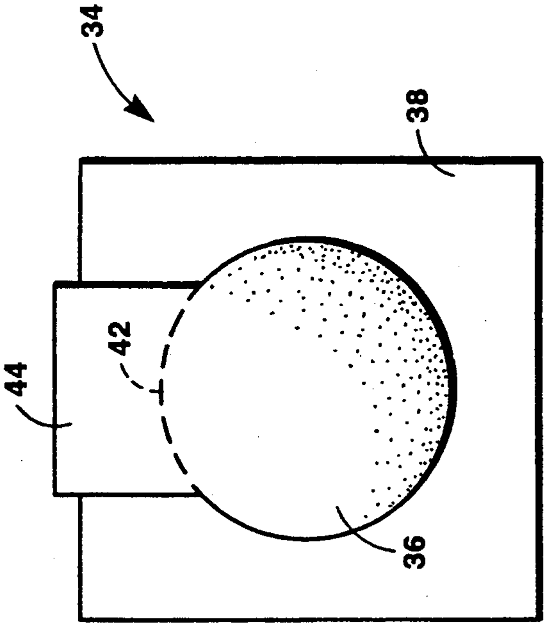
FIG. 3A is a top plan view of the shark patch including a pull tab.
Figure 3B:
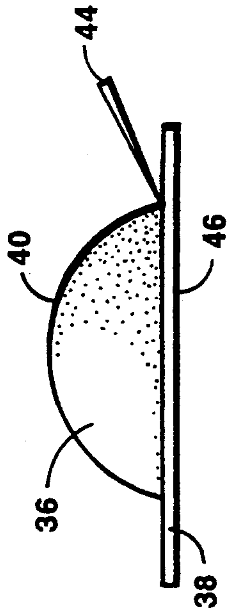
FIG. 3B is a side elevational view of the shark patch of FIG. 3A.

FIGS. 3A and 3B illustrate an embodiment of a shark patch 34 having a shark repellant 36 disposed on a highly flexible base 38; surrounded by a highly flexible, impermeable sealing membrane 40; provided with surface irregularities 42, which weaken the tensile strength of sealing membrane 40 in a localized area; and further having a pull tab 44. The pull tab 44 provides a user a convenient device for applying tension to the membrane 40 when delivery of the shark repellant 36 is desired. In this embodiment the surface irregularities 42 are limited so that tearing open the membrane 40 does not create an opening large enough for the solid mass of shark repellant 36 to slip out of the opening. In this, as well as the other embodiments of the shark patch, the shark repellant can be secured to the highly flexible base with an adhesive to ensure that the solid portion of the shark repellant remains associated with the base while the repellant is dispersing or dissolving. As with the other embodiments, an adhesive can also be disposed on a second side 46 of the highly flexible base 38 for attaching the shark patch 34 to a selected surface.

Figure 4A:
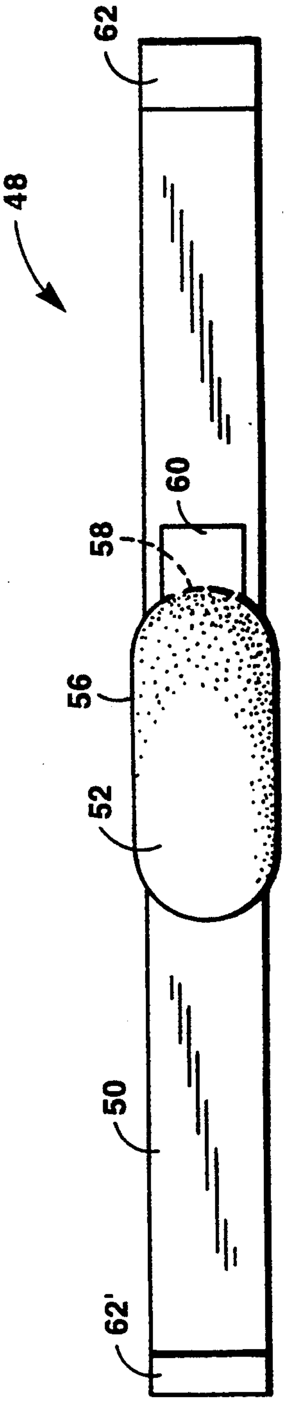
FIG. 4A is a top plan view of an embodiment of the shark patch configured as a wearable strap.
Figure 4B:
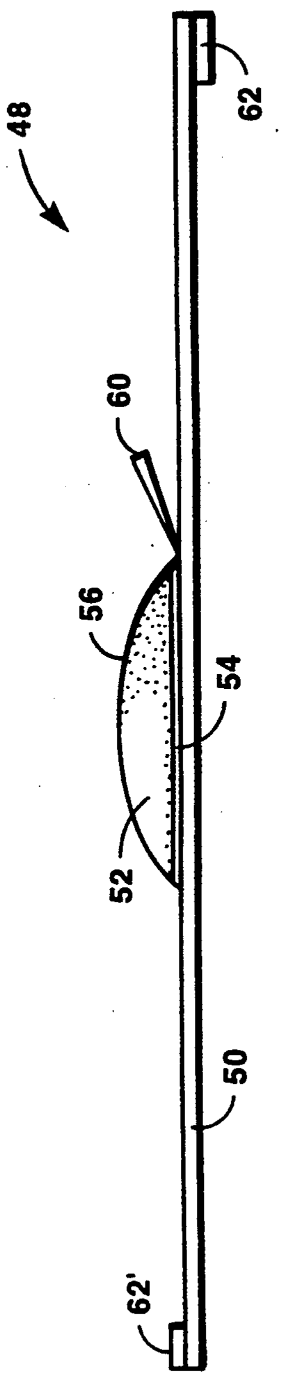
FIG. 4B is a side elevational view of the shark patch of FIG. 4A.

FIGS. 4A and 4B illustrate an embodiment of a shark patch 48 having a base 50 elongated to define a strap of sufficient length to wrap around a diver or surfer's wrist, arm, ankle, leg, or waist. Shark repellant 52 is disposed on a highly flexible base 54 and covered with a highly flexible, impermeable sealing membrane 56, having surface irregularities 58 which weaken the tensile strength of the sealing membrane 56 in a localized area. A tab 60 is disposed proximate the surface irregularities 58. The strap 50 includes hook and pile fasteners 62, 62', respectively.

Figure 5:
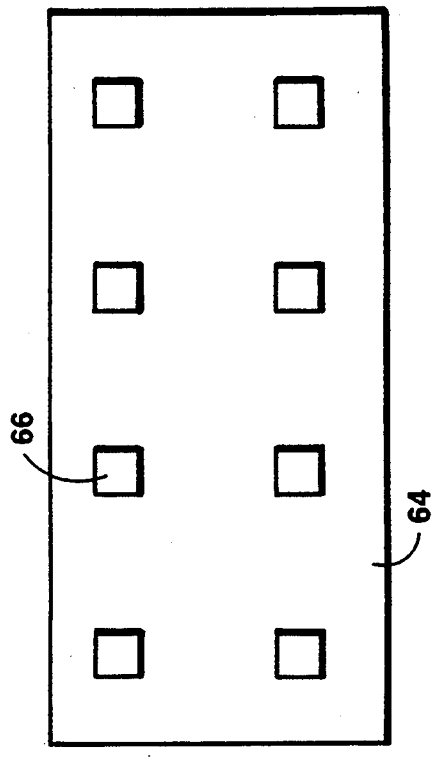
FIGS. 5–9 illustrate a sequence of steps in an exemplary method of manufacturing a shark patch.

The present invention further includes an exemplary method of manufacturing a shark patch, as illustrated in relevant part by FIGS. 5–9. Referring to FIG. 5, a step in the process for manufacturing a shark patch is shown, wherein a sheet of base or substrate material 64 is provided, and predetermined amounts of shark repellant 66 are disposed thereon in a spaced apart relationship.

Figure 6:
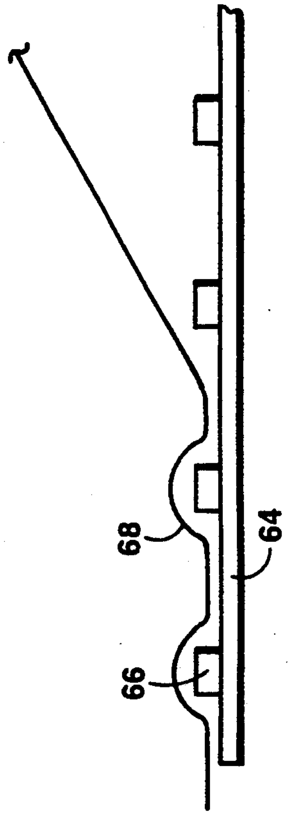

FIG. 6 shows a subsequent step in the process for manufacturing a shark patch, wherein a sheet of highly flexible, impermeable sealing membrane 68 is provided and disposed over the substrate.

Figure 7:
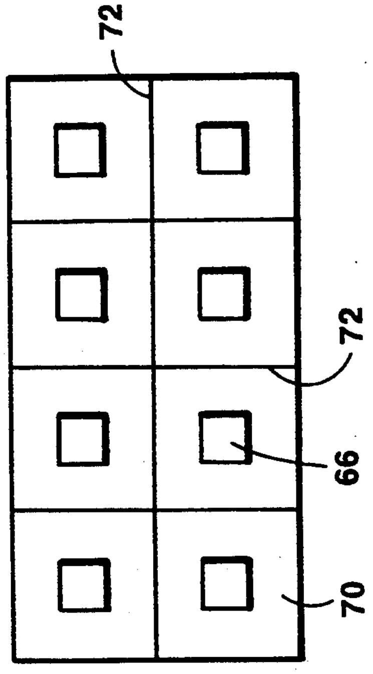

FIG. 7 illustrates the definition of individual enclosures 70 for the dollops of shark repellant 66 by one or more seals 72. The seals 72 are formed by placing the membrane 68 in sealing contact with the substrate material 64 at a predetermined distance around the periphery of the shark repellant 66.

In one embodiment of the method of making a shark patch, heat is applied to the sealing membrane 68 to bond it to the substrate material 64 and form a non-porous seal. Likewise, an epoxy that forms a chemical bond can be used to provide a seal. Mechanical seals such as provided by clamps or crimps are also contemplated.

One or more individual enclosures 70 are separated from the remainder of the enclosures by cutting, or another separating technique known in the art, to define one or more shark patches or to define one or more shark patches having one or more enclosures therein.

Figure 8:
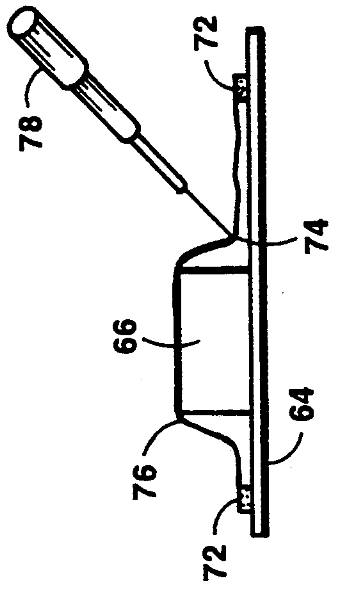

FIG. 8 shows surface imperfections 74 being induced in the surface of the membrane 76. This may be performed by dragging a heated member 78 across the surface of the membrane 76 or by providing an incomplete perforation.

Figure 9:
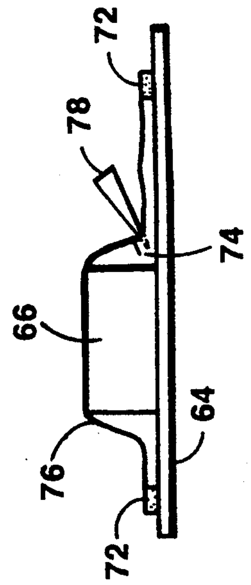

FIG. 9 illustrates a pull tab 78 being attached to the membrane 68 proximate the region of surface imperfections 74.

It will be appreciated by persons skilled in the art that the present invention is not limited to what has been particularly shown and described herein. A variety of modifications and variations are possible in light of the above teachings without departing from the scope and spirit of the invention, which is limited only by the following claims.

What is claimed is:

1. A shark repellant patch, comprising;

a flexible base having a first and second side;

a shark repellant deposited on said first side of said flexible base;

a flexible, impermeable sealing membrane secured to said flexible base, said membrane enveloping said shark repellant and said membrane including a region having a tensile strength less than other regions of said membrane; and a tab proximate said region, wherein pulling said tab shears said membrane in said region.

2. The shark patch of claim 1, further including an adhesive securing said shark repellant to said first side of said flexible base.

3. The device of claim 1, further including an adhesive disposed on said second side of said flexible base.

4. The device of claim 1, wherein said flexible base is elongated and includes a quick fastener.

* * * * *